(12) United States Patent
Sandberg

(10) Patent No.: US 6,793,715 B1
(45) Date of Patent: Sep. 21, 2004

(54) EQUIPMENT AIR FILTER

(76) Inventor: Leslye Sandberg, 20884 N. Exmoor Ave., Barrington, IL (US) 60010

( * ) Notice: Subject to any disclaimer, the term of this patent is extended or adjusted under 35 U.S.C. 154(b) by 55 days.

(21) Appl. No.: 09/932,426

(22) Filed: Aug. 17, 2001

(51) Int. Cl.[7] .............................. B01D 46/10; B03C 3/00
(52) U.S. Cl. .............................. 95/273; 96/66; 96/67; 96/68; 55/486; 55/488; 55/490; 55/495; 55/496; 55/500; 55/501; 55/521; 55/528; 55/DIG. 31
(58) Field of Search .......................... 55/385.1, 385.6, 55/486, 488, 489, 490, 495, 496, 500, 501, 511, 521, 528, DIG. 31; 96/66, 67, 68; 95/273

(56) References Cited

U.S. PATENT DOCUMENTS

| | | |
|---|---|---|
| 3,203,338 A | 8/1965 | Dry |
| 3,522,923 A | 8/1970 | Charpentier |
| 3,752,055 A | 8/1973 | Shuler |
| 3,905,787 A * | 9/1975 | Roth ..................... 55/DIG. 31 |
| 3,912,473 A | 10/1975 | Wilkins |
| 4,340,402 A * | 7/1982 | Catron ........................ 55/501 |
| 4,470,834 A | 9/1984 | Fasanaro |
| 4,689,058 A * | 8/1987 | Vogt et al. ............. 55/DIG. 31 |
| 4,889,542 A * | 12/1989 | Hayes ....................... 55/385.6 |
| 4,961,849 A | 10/1990 | Hull |
| 5,419,953 A * | 5/1995 | Chapman ..................... 55/486 |
| 5,462,569 A | 10/1995 | Benjamin |
| 5,525,136 A * | 6/1996 | Rosen ......................... 55/486 |
| 5,525,145 A | 6/1996 | Hodge |
| 5,573,562 A | 11/1996 | Schauwecker |
| 5,681,630 A | 10/1997 | Smick |
| 5,689,969 A * | 11/1997 | Conroy ........................ 55/490 |
| 5,704,953 A * | 1/1998 | Stemmer ..................... 55/521 |
| 5,766,285 A * | 6/1998 | Killman ..................... 55/385.6 |
| 5,827,340 A * | 10/1998 | Fiske ........................ 55/385.6 |
| 6,174,340 B1 | 1/2001 | Hodge |
| 6,221,120 B1 * | 4/2001 | Bennington et al. ....... 55/385.1 |

OTHER PUBLICATIONS

Copy of packaging for ACE air conditioner filter (date unkown).
Photograph of Filter Pro Supercharger Screen Filter (date unknown).

* cited by examiner

Primary Examiner—Duane Smith
Assistant Examiner—Jason M. Greene
(74) Attorney, Agent, or Firm—Michael Best & Friedrich LLP

(57) ABSTRACT

The invention provides a filter that can be cut-to-fit or deformed to fit a variety of differently shaped and sized intakes. The invention also provides a filter kit that allows a user to create a filter of a desired size with attaching mechanisms to secure the filter to or on the intake.

27 Claims, 4 Drawing Sheets

EQUIPMENT AIR FILTER

BACKGROUND OF THE INVENTION

The invention relates to filtration systems and, in particular, to a self-supporting filter that is readily fixed to or positioned on or in equipment intakes.

Clean air is important in the efficient operation of a variety of machines and systems. Forced-air cooling and heating systems, internal combustion engines, and even office equipment require clean air for proper operation. In most instances, filters are specially designed to fit into or onto an intake of the device with which the filter is used. This requires manufactures to produce a large variety of differently shaped and configured filters. For example, some filters come in numerous sizes based on width, length, and height. Of course, the near endless number of different filter sizes and configurations makes replacing filters difficult for users. In order to replace a used filter, an exact replacement filter of the correct size and style must be purchased. This is true even though the filtering media used in differently sized filters is often the same or very similar. When the exact filter needed is not available or out-of-stock, special ordering arrangements must be made.

SUMMARY OF THE INVENTION

Although current filters are functional, the system of making custom filters for each application is inefficient. The invention provides a filter that can be cut-to-fit or deformed to fit a variety of differently shaped and sized intakes. The invention also provides a filter kit that allows a user to create a filter of a desired size with attaching mechanisms to secure the filter to or on the intake.

The present invention is directed to a filter assembly that includes a self-supporting filter media and a plurality of attachment strips. The self-supporting filter media is configured to filter non-gaseous items from a gas flow. The attachment strips have a first portion that is attachable to the filter media and a second portion that is attachable to a housing surrounding an intake.

The present invention is also directed to a filter assembly that includes a filter media, a deformable frame, and attachment strips. The deformable frame is positioned around at least a portion of the filter media. The attachment strips have first sides and second sides. The first sides are attached to the deformable frame and the second sides are removably attachable to a housing surrounding an inlet.

The present invention is also directed to a method of mounting a filter to an intake on a housing. The method includes selecting a filter media, forming the filter media to a desired size to match the size and contours of the intake, fitting attachment strips along the periphery of the filter media, and securing the filter media to the intake with the attachment strips.

Other features and advantages of the present invention will become apparent by consideration of the detailed description and accompanying drawings.

DETAILED DESCRIPTION

Figure 1:
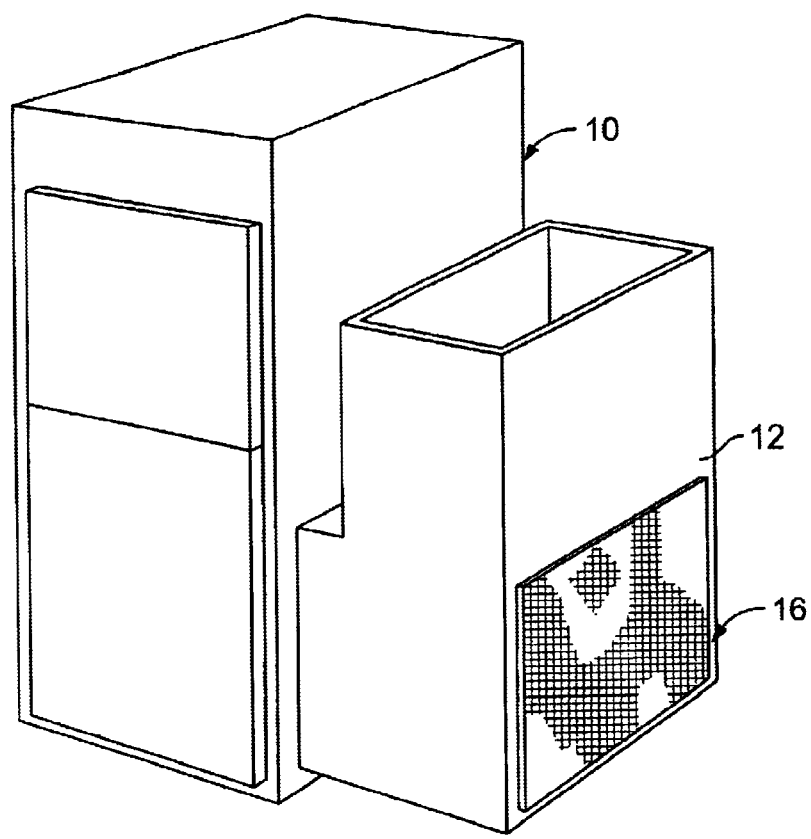
FIG. 1 is a perspective view illustrating an apparatus with an air intake and a filter assembly of one embodiment of the present invention.

Before embodiments of the invention are explained, it is to be understood that the invention is not limited in its application to the details of the construction and the arrangements of the components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

Figure 2:
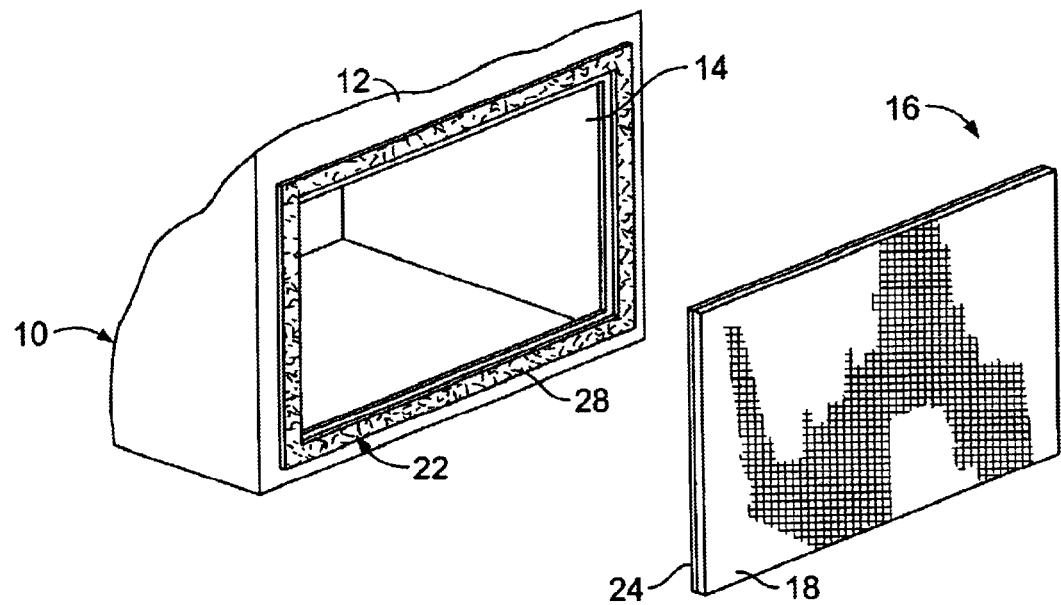
FIG. 2 is an enlarged perspective view of the filter assembly shown in FIG. 1.

FIG. 1 illustrates an apparatus 10 such as an air conditioner or heat pump which includes a housing 12 with an air intake 14 (FIG. 2) and an air outlet (not shown). A fan (not shown) operates to draw air (creating an air or gas flow) through the air intake 14 into the housing 12 and through the air outlet. A filter assembly 16 is connected to the housing 12 and covers the intake 14 to prevent debris, contaminants, and other non-gaseous items present within the air from entering into the housing 12 through the intake 14.

Figure 3:
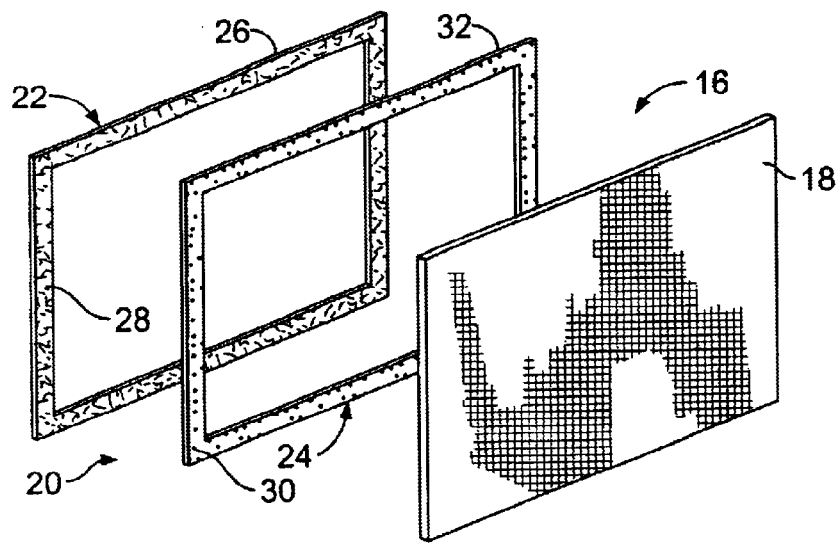
FIG. 3 is an exploded view of the filter assembly shown in FIG. 1.
Figure 4:
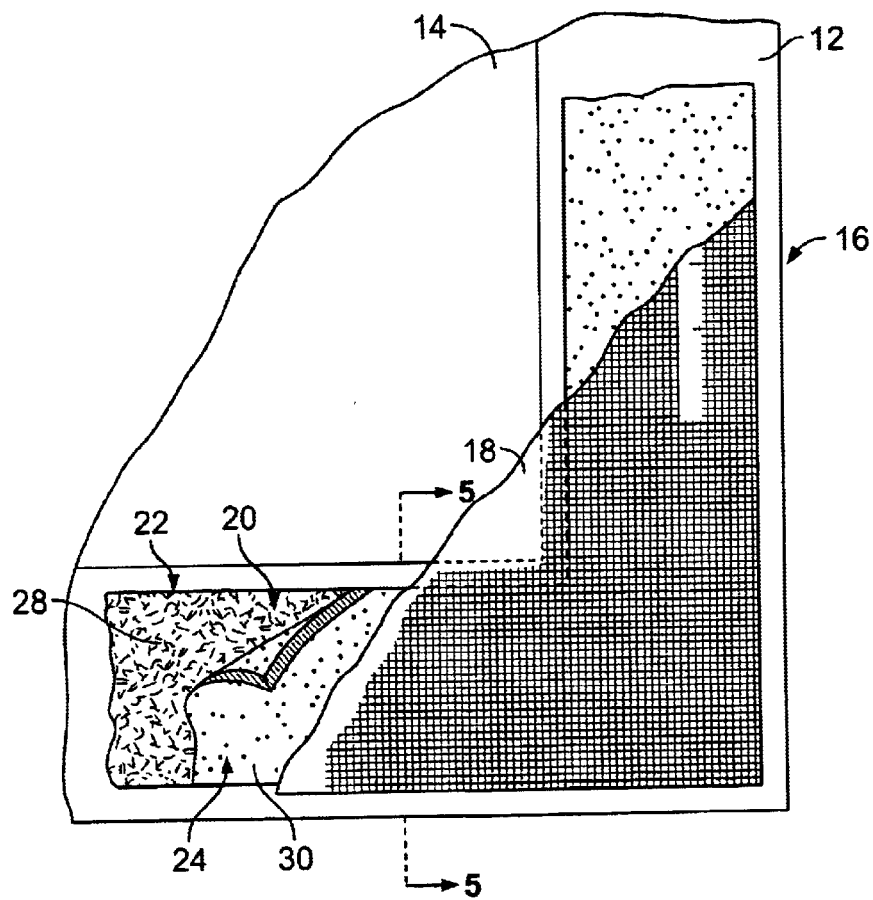
FIG. 4 is a partially-sectioned front view of the filter assembly shown in FIG. 1.
Figure 5:
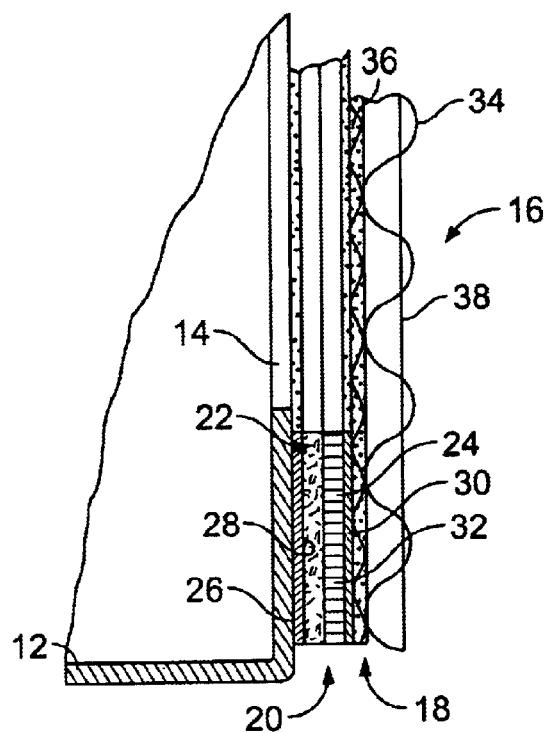
FIG. 5 is a cross-sectional view taken along line 5—5 in FIG. 4.

As shown in FIG. 3, the filter assembly 16 includes a filter 18 and attachment strips 20. The filter 18 is detachably connected to the housing 12 around the intake 14 by the attachment strips 20, such as VELCRO hoop and loop fastening strips. FIGS. 4 and 5 further illustrate that the attachment strips 20 are generally located around the perimeter of the filter 18. The attachment strips 20 can be separate strips that are cut to length by scissors or the like and combined to cover the perimeter of the filter 18. Alternatively, the attachment strips 20 could be made of a single integral piece that is cut to size by a cutting die.

The attachment strips 20 includes a first portion 22 that is attached to the housing 12 and a second portion 24 that is attached to the filter 18. The first portion 22 includes an adhesive face 26 that is attachable to the housing 12 and a hook and loop face 28. The second portion 24 includes an adhesive face 30 that is attachable to the filter 18 and a hook and loop face 32 that is removably attachable to the mating hook and loop face 28 on the first portion 22 of the attachment strip 20. Alternatively, the second portion 24 of the attachment strip 20 could be attached to the filter 18 by stitching, stapling, gluing, taping, or the like. It should be noted that only a single portion of an attachment strip 20 could be used to attach the filter to the housing. Specifically, an adhesive face 26 of the single portion attaches to the housing 12, and a hook and loop face 32 of the single portion fastens directly to the filter 18.

As best shown in FIG. 5, the filter 18 is a washable, semi-rigid, three-dimensional type, synthetic media filter. In the illustrated embodiment, the three-dimensional type filter is a corrugated weave filter as opposed to a flat woven screen or other two-dimensional type filter. Three-dimensional type filters generally include a thickness component that increases the effectiveness of the filter and provides the filter with increased stability compared to the two-dimensional type filters. In contrast to typical filters that are mounted inside of equipment, the illustrated filter 18 is mounted to the exterior of equipment, and, therefore, the synthetic media is UV protected and is protected from degradation due to exposure to sunlight and hostile environments (e.g. rain, chemicals, oil, etc.). The filter 18 has a permanent electrostatic charge to facilitate the pickup of dust and other airborne contaminants. The filter 18 is self-supporting and is therefore capable of maintaining its shape under the pressure of its own weight. The filter 18 is, however, easily deformable to match the contours of the surface of the housing 12.

In the illustrated embodiment, the filter 18 includes a corrugated layer 34 and a base layer 36, each made of woven synthetic polymer fibers. The corrugated layer 34 is woven together with the base layer 36 and a top layer 38 such that the corrugated layer 34 is between the base layer 36 and the top layer 38. The top layer 38 includes a plurality of threads that extend transversely to the corrugation direction of the corrugated layer 34.

It can be seen that a custom-sized filter assembly 16 can be easily constructed by an individual on site with minimal materials. A filter kit, including bulk rolls or amounts of filter material and attachment strips, is all that would be necessary for an individual to create a filter assembly 16 to fit over almost any sized intake 14 opening. For example, the filter material could easily be cut by a pair of scissors to form a filter 18 that would cover an intake 14 opening. Next, attachment strips could be cut to length from the bulk roll so that the attachment strips 20 would substantially outline the perimeter of the filter 18. After adhering the adhesive side 26 of the first portion 22 around the intake 14 of the housing 12 and the adhesive side 30 of the second portion 24 around the filter 18, the hook and loop sides 28, 32 of the first and second portions 22, 24 could be removably attached to each other such that the filter 18 covers the intake 14 opening in the housing 12.

Figure 6:
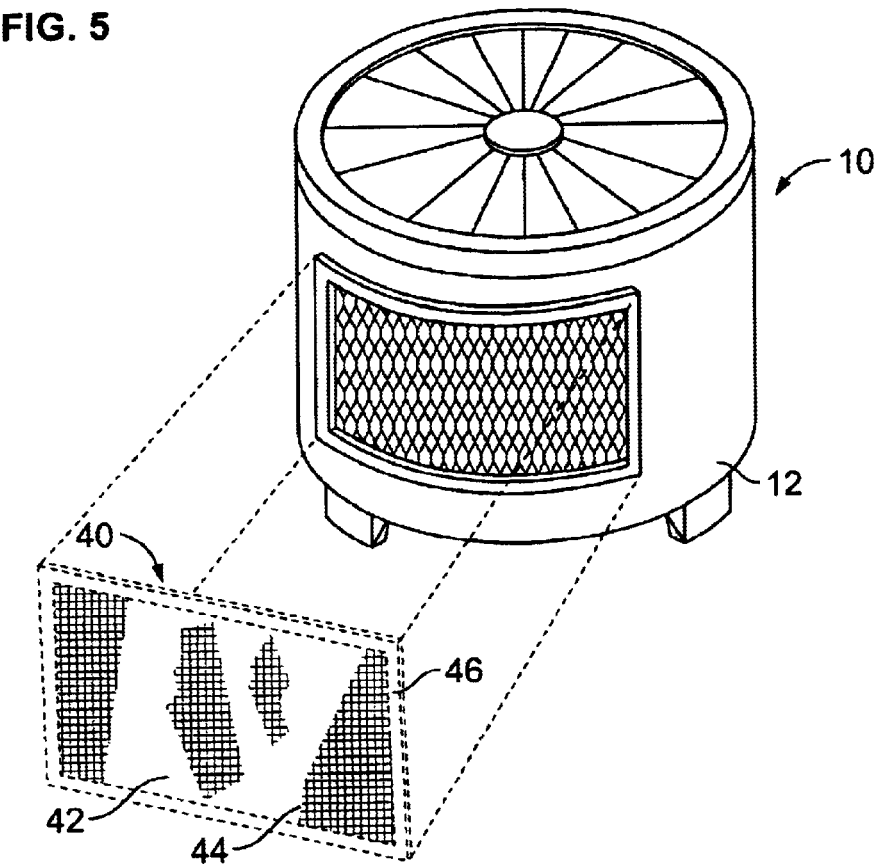
FIG. 6 is a perspective view illustrating an apparatus with an intake and a filter assembly of an alternative embodiment of the present invention.

FIG. 6 illustrates an apparatus 10 that includes an intake 14 and a filter assembly 40 of an alternative embodiment of the present invention. The apparatus 10 includes a housing 12 with the air intake 14 and an air outlet (not shown). A fan (not shown) operates to draw air in through the air intake 14 into the housing 12 and through the air outlet. The filter assembly 40 is connected to the housing 12 and covers the intake 14 to prevent debris and contaminants in the air from entering into the housing 12 through the intake 14.

Figure 8:
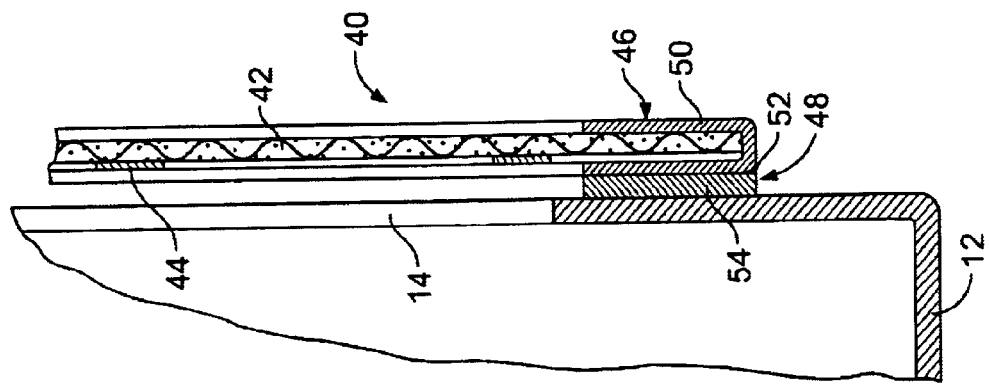
FIG. 8 is a cross-sectional view taken along line 8—8 in FIG. 7.
Figure 7:
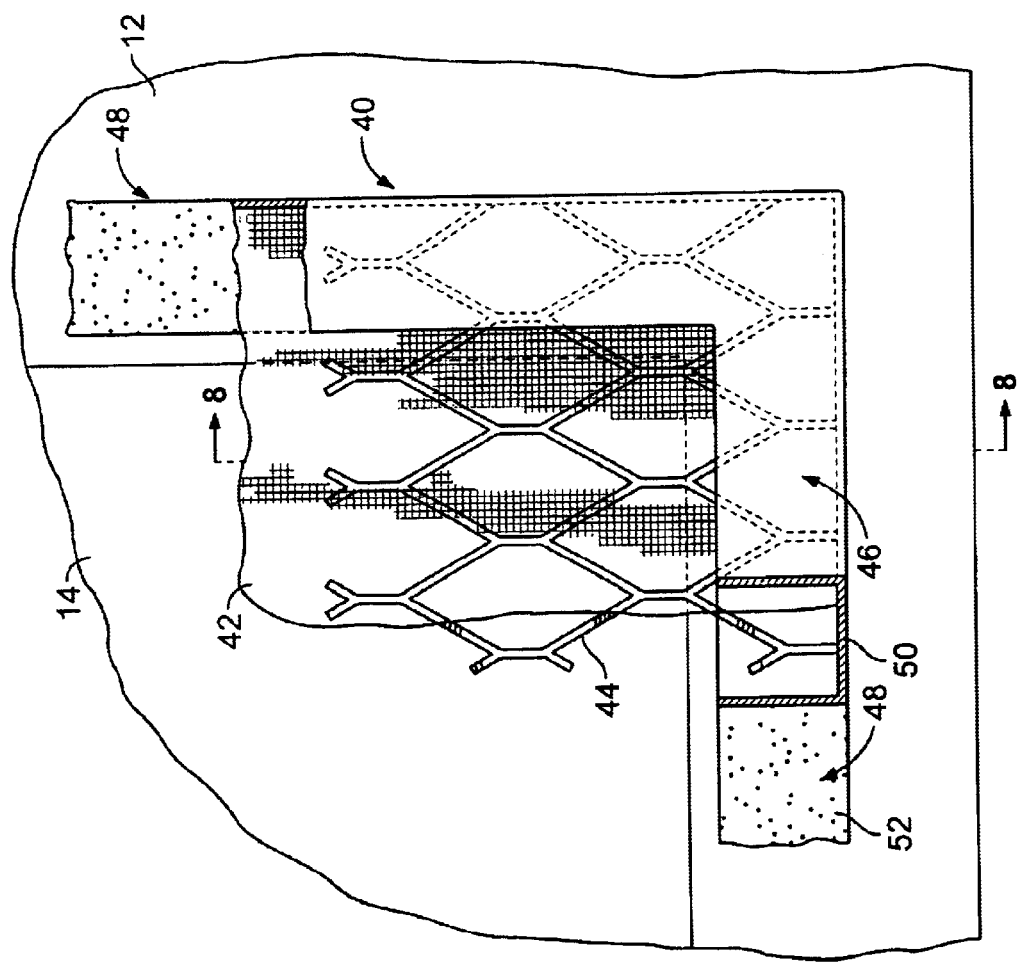
FIG. 7 is a partially-sectioned front view of the filter assembly shown in FIG. 6.

As shown in FIGS. 7 and 8, the filter assembly 40 includes a filter 42, a support structure 44, a frame 46, and attachment strips 48. The filter 42 and the support structure 44 are supported within the frame 46 such that the filter 42 and the support structure 44 are adjacent to each other. The filter 42 can be any known filter media and is prevented from substantial movement in one direction by the support structure 44. The support structure 44 is a thin metal screen that is an expanded metal media designed to support the filter 42 and allow air flow through the filter. The support structure 44 is typically manufactured by cutting offset slits into a sheet of the metal material and pulling the metal sheet in a direction that is perpendicular to the direction of the slits.

The frame 46 includes multiple C-shaped and thin-walled metal channels 50 that are assembled to enclose and support the support structure 44 and the filter 42. The metal frame 46 and support structure 44 are substantially rigid, however they are also semi-flexible such that the frame 46 and support structure 44 can be formed to match the contours of the housing 12 to which it is attached. In addition, the frame 46 allows slight flexing to effectively seal against a flat surface that is not perfectly planar. Alternatively, the support structure 44 and the frame 46 could be made from an easily flexible polymer material such as polypropylene, polyester, polyethylene, or the like.

The frame 46 is attached to the housing 12 by the attachment strips 48, such as magnetic strips. The attachment strips 48 include adhesive sides 52 which are attached to the frame 46 and magnetic sides 54 that are detachably attached to the metal housing 12 around the intake 14 opening. Alternatively, the attachment strips 48 could be glued to the frame 46 or the frame 46 itself could be magnetized to facilitate the connection with the housing 12.

As can be seen from the above, the invention provides, among other things, a filter assembly 40 and/or filter kit that can be (i) cut to fit a variety of intake 14 openings; (ii) simply placed over the intake 14 opening with the attachment strips 20, 48 to conveniently and reliably filter air flowing into the housing 12 through the 30 intake 14; and (iii) formed to match irregularities that are present in the housing 12 of different apparatuses 10 to which the filter assembly 16, 40 can be attached. Various features and advantages of the invention are set forth in the following claims.

What is claimed is:

1. A filter assembly comprising:
   a self-supporting permanently electrostatically charged three-dimensional filter media made from a synthetic polymer fiber configured to filter non-gaseous items including dust and other airborne contaminants from a gas flow; and
   a plurality of attachment strips, each strip having a first portion attachable to the filter media and a second portion attachable to a housing surrounding an intake.

2. The filter assembly of claim 1, wherein the filter media is washable.

3. The filter assembly of claim 1, wherein the filter media is semi-rigid.

4. The filter assembly of claim 1, wherein the filter is UV protected.

5. The filter assembly of claim 1, wherein the three-dimensional filter includes a corrugated layer and a base layer that is interwoven with the corrugated layer.

6. The filter assembly of claim 5, wherein the filter includes a top layer that is interwoven with the corrugated layer such that the corrugated layer is between the base layer and the top layer.

7. The filter assembly of claim 1, wherein the filter assembly is deformable to match the contour of the housing around the intake.

8. The filter assembly of claim 1, wherein the attachment strips surround the perimeter of the filter media.

9. The filter assembly of claim 1, wherein the first portion includes a first adhesive side, the first adhesive side being attachable to the filter media.

10. The filter assembly of claim 9, wherein the second portion includes a first adhesive side attachable to the housing.

11. The filter assembly of claim 10, wherein the first portion includes a second side and the second portion includes a second side, wherein the second sides of the first and second portions are removably attachable to each other by hook and loop fasteners.

12. A filter assembly comprising
   a permanently electrostatically charged three-dimensional filter media made from a synthetic polymer fiber;

a deformable frame positioned around at least a portion of the filter media; and attachment strips having first sides and second sides, the first sides being attached to the deformable frame and the second sides being removably attachable to a housing surrounding an inlet.

13. The filter assembly of claim 12, further comprising a support structure, wherein the frame is at least positioned around at least a portion of the support structure.

14. The filter assembly of claim 13, wherein the filter media and the support structure are adjacent to each other within the frame.

15. The filter assembly of claim 14, wherein the frame completely surrounds the perimeter of the filter media and the support structure.

16. The filter assembly of claim 13, wherein the support structure is a metal screen.

17. The filter assembly of claim 16, wherein the metal screen is an expanded media designed to allow air flow.

18. The filter assembly of claim 12, wherein the frame includes thin walled C-shaped metal channels.

19. The filter assembly of claim 12, wherein the frame is substantially rigid.

20. The filter assembly of claim 12, wherein the frame is made of a flexible polymer.

21. The filter assembly of claim 12, wherein the attachment strips are magnetic strips.

22. The filter assembly of claim 21, wherein the magnetic strips are flexible.

23. The filter assembly of claim 21, wherein the magnetic strips are attached to the frame by adhesive.

24. A method of mounting a filter to an intake on a housing, the method comprising:

selecting a permanently electrostatically charged three-dimensional filter media having a periphery;

forming the filter media to a desired size to match the size and contours of the intake;

fitting attachment strips along the periphery of the filter media; and securing the filter media to an intake with the attachment strips.

25. A method as claimed in claim 24, wherein forming the media filter includes cutting the filter media.

26. A method as claimed in claim 24, further comprising positioning a deformable frame around the periphery of the filter media.

27. A method as claimed in claim 26, wherein forming the media filter includes deforming the filter media and deformable frame.

* * * * *